(12) United States Patent
Leu et al.

(10) Patent No.: US 9,181,841 B2
(45) Date of Patent: Nov. 10, 2015

(54) METHOD AND APPARATUS FOR MONITORING THE LIGHT-OFF TEMPERATURE OF A DIESEL OXIDATION CATALYST

(75) Inventors: Alexander Leu, Idstein (DE); Torsten Mueller, Reusselsheim (DE); Markus Wesslau, Dreieich (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 757 days.

(21) Appl. No.: 12/862,469

(22) Filed: Aug. 24, 2010

(65) Prior Publication Data

US 2011/0120091 A1 May 26, 2011

(30) Foreign Application Priority Data

Aug. 24, 2009 (GB) .................................. 0914759.6

(51) Int. Cl.
  *F01N 3/00* (2006.01)
  *F01N 11/00* (2006.01)
  (Continued)

(52) U.S. Cl.
  CPC ............ *F01N 11/002* (2013.01); *F02D 41/025* (2013.01); *F02D 41/062* (2013.01); *F01N 2550/02* (2013.01); *F02D 41/0005* (2013.01);
  (Continued)

(58) Field of Classification Search
  CPC .............. F01N 11/002; F01N 2550/02; F02D 2200/0804; F02D 41/025; F02D 41/1446; F02D 41/405; F02D 41/0255; F02D 41/062; Y02T 10/26; Y02T 10/47
  USPC .................................... 60/274–277, 285, 299
  See application file for complete search history.

(56) References Cited

U.S. PATENT DOCUMENTS 6,523,341 B1 * 2/2003 Rumpsa et al. ................. 60/277
7,121,085 B2 * 10/2006 van Nieuwstadt .............. 60/286
(Continued)

FOREIGN PATENT DOCUMENTS

GB 2282467 A 4/1995
GB 2381763 A 5/2003
(Continued)

*Primary Examiner* — Kenneth Bomberg
*Assistant Examiner* — Diem Tran
(74) *Attorney, Agent, or Firm* — Ingrassia Fisher & Lorenz PC

(57) ABSTRACT

A method is provided for monitoring the light-off temperature of a diesel oxidation catalyst of a combustion engine. The method includes, but is not limited to measuring the temperature of the exhaust gas upstream and downstream of the diesel oxidation catalyst during a post injection phase or after injection phase of the combustion engine, determining whether a catalyst light-off occurred by using the temperature data of the exhaust gas, calculating the surface temperature of the diesel oxidation catalyst by using the measured temperature data of the exhaust gas, and defining the calculated temperature as light-off temperature of the diesel oxidation catalyst in the case that a catalyst light-off is determined. By means of the method, it is possible to determine the actual light-off temperature of the diesel oxidation catalyst for instance after each engine start by means of calculating the surface temperature of the diesel oxidation catalyst. Since the light-off temperature is not considered as a constant but as a changing variable, the aging of the diesel oxidation catalyst is sufficiently considered. Thus, it is provided a means for monitoring the light-off temperature of a diesel oxidation catalyst considering an aging of the diesel oxidation catalyst.

23 Claims, 2 Drawing Sheets

(51) Int. Cl.
*F02D 41/02* (2006.01)
*F02D 41/06* (2006.01)
*F02D 41/00* (2006.01)
*F02D 41/14* (2006.01)
*F02D 41/40* (2006.01)

(52) U.S. Cl.
CPC ......... *F02D 41/0255* (2013.01); *F02D 41/1446* (2013.01); *F02D 41/405* (2013.01); *F02D 2200/0804* (2013.01); *Y02T 10/26* (2013.01); *Y02T 10/47* (2013.01)

(56) References Cited

U.S. PATENT DOCUMENTS 7,533,524 B2 * 5/2009 Wang et al. .............. 60/297
2008/0083271 A1 4/2008 He et al.

FOREIGN PATENT DOCUMENTS

JP 2003214153 A 7/2003
WO 2006125151 A2 11/2006

* cited by examiner

METHOD AND APPARATUS FOR MONITORING THE LIGHT-OFF TEMPERATURE OF A DIESEL OXIDATION CATALYST

CROSS-REFERENCE TO RELATED APPLICATION

This application claims priority to British Patent Application No. 0914759.6, filed Aug. 24, 2009, which is incorporated herein by reference in its entirety.

TECHNICAL FIELD

The invention relates to a method and an apparatus for monitoring the light-off temperature of a diesel oxidation catalyst.

BACKGROUND

Diesel oxidation catalysts (DOC) placed in the exhaust flow path of diesel-powered engines are known to treat the exhaust of diesel engines before venting to the atmosphere in order to convert noxious pollutants such as hydrocarbon and carbon monoxide by catalyzing the oxidation of these pollutants to carbon dioxide and water.

The diesel oxidation catalyst activity generally increases with temperature. For diesel oxidation catalysts a threshold temperature is necessary for the diesel oxidation catalyst to "light-off" and convert the noxious gases by oxidation. The "light-off temperature" is defined as the temperature at which 50 mol % of present HC-compounds are catalytically converted. It is important for a diesel oxidation catalyst to reach the necessary working temperature as soon as possible after a cold starting in order to work properly.

The light-off behaviour and performance of a catalyst not only is a function of catalytic formulation and coating density but also of operating conditions. The most significant shift in the light-off temperature occurs with the age of the diesel oxidation catalyst, as the light-off temperature increases with age. Usually, the onboard system of a motor vehicle is adjusted to that on the basis of the assumption of a completely aged diesel oxidation catalyst which leads to a high light-off temperature.

It is a disadvantage that the shift in light-off temperature of aging diesel oxidation catalysts is not sufficiently considered in the motor vehicle.

It is at least one object of the invention to provide a device or means for monitoring the light-off temperature of a diesel oxidation catalyst considering an aging of the diesel oxidation catalyst.

SUMMARY

The method for monitoring the light-off temperature of a diesel oxidation catalyst of a combustion engine, comprising the steps of measuring the temperature of the exhaust gas upstream and downstream of the diesel oxidation catalyst during a post injection phase or after injection phase of the combustion engine, determining whether a catalyst light-off occurred by using the measured temperature data of the exhaust gas, calculating the surface temperature of the diesel oxidation catalyst by using the measured temperature data of the exhaust gas, and defining the calculated temperature as light-off temperature of the diesel oxidation catalyst in the case that a catalyst light-off is determined. If no light-off is determined a stored value of the light-off temperature can be used, wherein the stored value is particularly a calculated surface temperature at a sooner detected light-off or an estimated initial value of the light-off temperature.

By means of the method according to an embodiment of the invention it is possible to determine the actual light-off temperature of the diesel oxidation catalyst for instance after each engine start by means of calculating the surface temperature of the diesel oxidation catalyst. Since the light-off temperature is not considered as a constant but as a changing variable, the aging of the diesel oxidation catalyst is sufficiently considered. Thus, it is provided a means for monitoring the light-off temperature of a diesel oxidation catalyst considering an aging of the diesel oxidation catalyst. This leads to a self-learning engine control. An improper or too conservative emission strategy can be prevented. Surprisingly the measurement of temperatures upstream and downstream the diesel oxidation catalyst only is sufficient for both determining the presence of a light-off and calculating the actual light-off temperature. The measurement of further variables is not necessary. Since the actual light-off temperature is determined unforeseeable influences, like environment conditions or tolerances in properties of the diesel oxidation catalyst can be considered. The engine control can always use a very accurate value of the light-off temperature and is able to apply suitable emission strategies, which allows meeting highest emission standards with less energy effort. Due to a late post- or after-injection of fuel, the fuel is discharged into the exhaust line being at least partially unburnt. Advantageously, the exhaust gas thereby is enriched with reducing agents. Preferably a plurality of calculated light-off temperatures can be stored over a longer time for extrapolating the further aging of the diesel oxidation catalyst. Storing the determined catalyst light-off temperature in the engine control unit allows that the stored light-off temperature can be used in a comparison with a calculated catalyst light-off temperature of a following monitoring. Storing of the determined catalyst light-off temperature in the engine control unit further allows a later evaluation of the efficiency of the diesel catalyst. The determined catalyst light-off temperature can be displayed, for example to the driver in the cockpit or for system analysis purposes.

The term "post-injection" is to be understood as meaning an injection with open or partially open exhaust valve, while the term "after-injection" according to the invention is to be understood as meaning an injection with closed exhaust valve. In preferred embodiments post-injection is used.

Preferably, the temperature of the exhaust gas upstream of the diesel oxidation catalyst is measured at the inlet of the diesel oxidation catalyst and/or the temperature of the exhaust gas downstream of the diesel oxidation catalyst is measured at the outlet of the diesel oxidation catalyst.

In preferred embodiments, the method according to the invention advantageously allows for an accurate determination of the light-off temperature of a catalyst by measuring the temperature of the exhaust gas upstream and downstream of the diesel oxidation catalyst, only. It is especially advantageous that measurements of the volume or concentrations of gaseous compounds of the exhaust gas using delicate sensors or sensors providing insufficient accuracy of measurement are dispensable.

Particularly the value of the calculated surface temperature is compared with a stored surface temperature and/or stored light-off temperature. The stored value can be stored in a storing device of the engine control. If no light-off and/or only a negligible difference between the detected value and the stored value is determined the stored value may be defined as light-off temperature else the stored value can particularly be replaced by the calculated value. The negligible difference can be defined by a predefined threshold, wherein the threshold is particularly greater than the measurement tolerances of temperature sensors for measuring the temperatures of the exhaust gas upstream and downstream the diesel oxidation catalyst. By means of the comparison unnecessary working steps inside the engine control can be prevented. Further a plausibly check can be initiated before a stored value is overwritten. Comparing the calculated catalyst light-off temperature to a catalyst light-off temperature stored in the engine control unit may result in storing a new light-off-temperature depending upon if a light-off temperature was measured and if the measured light-off temperature is below or above the stored light-off-temperature. For example, a new light-off-temperature resulting in a decrease of the stored light-off-temperature may be stored if a light-off below the current stored light-off temperature is measured, or a new light-off temperature resulting in an increase of the stored light-off temperature may be stored if no light-off was measured above the current stored light-off temperature. Further, no light-off-temperature may be stored meaning no change of the stored light-off temperature if the light-off measured is above the current stored light-off temperature or no light-off was detected below the current stored light-off temperature.

Preferably the method is repeated after engine start until at least one catalyst light-off is determined. Particularly the method is terminated after the determination of a light-off. One calculation of the actual light-off temperature can be sufficient for considering aging effects of the diesel oxidation catalyst. Additional calculating effort can be prevented, so that the method according to invention can be incorporated into present software based engine controls without affecting the calculation power of a used CPU.

In a preferred embodiment the method comprises the step that the calculated surface temperature is compared with an estimated light-off temperature calculated in an engine control. Advantageously, the method according to the invention allows for an online on board monitoring of the light-off temperature. It is advantageous, that the method according to the invention allows for a monitoring of the light-off temperature during normal operation of the motor vehicle. Especially, the diesel oxidation catalyst light-off temperature can be determined without a cold starting of the engine. Therefore, the method of the invention allows for an accurate adjustment to the increasing light-off temperature of an aging diesel oxidation catalyst.

In another preferred embodiment, measuring temperature the temperatures is carried out using a throttling action in the intake tract of the diesel engine, preferably an intensified throttling action. Preferably, the throttling can be intensified by partially closing an air choke, thereby throttling the air throughput. Advantageously, a throttling can improve the temperature measurement.

In another preferred embodiment, measuring the temperatures is carried out during constant operation mode or during a coasting phase of the engine. Preferably, the light-off temperature is measured during a coasting phase. Advantageously, a clear response in temperature and/or the extent of oxidation of hydrocarbon and/or carbon monoxide is measurable. Due to the delay time of the catalytic effect, higher differences between the upstream and downstream temperatures can be measured in the late coasting phase.

Preferably, a finite coasting phase is used. Preferably, the post- or after-injection and/or the throttling action is carried out during a defined time period depending on engine speed. Advantageously, such a time period allows for sufficient fuel to be injected providing a reliable measurement of the exothermic oxidation of the corresponding amount of hydrocarbon and/or carbon monoxide in the diesel oxidation catalyst.

Preferably, measuring the temperatures using post- or after-injection of fuel and throttling during a coasting phase allows for determining an exothermic reaction for a diesel oxidation catalyst during normal operation of a vehicle. Especially, an exothermic reaction is measurably after a cold starting of the engine.

Preferably, calculating the surface temperature of the diesel oxidation catalyst comprises determining a temperature profile of the exothermic reaction of hydrocarbons and/or carbon monoxide in the diesel oxidation catalyst. Advantageously, an exothermic reaction profile allows a reliable determination of the diesel oxidation catalyst light-off temperature.

Preferably, the calculation of the surface temperature is based on a temperature model. The calculation of the diesel oxidation catalyst light-off temperature preferably is based on the assumption that the diesel oxidation catalyst is considered being an ideal heat exchanger and thus can be approximated as an 1st-order lag element or in short a PT 1-element. Then, the heat quantity that is transferred to the diesel oxidation catalyst, defines the temperature change of the diesel oxidation catalyst. Preferably, the calculation of the PT1-relevant values is realised according to the equations discussed below.

Preferably, a relationship for the variable time constant for temperature calculation based on PT1 behaviour is based on the measurement of the inlet temperature of the exhaust gas ($T_{in}$) upstream of the diesel oxidation catalyst and the outlet temperature of the exhaust gas ($T_{out}$) downstream of the diesel oxidation catalyst. Approximating the diesel oxidation catalyst being an PT1-element, further variables preferably are the mass of the diesel oxidation catalyst ($m_{DOC}$), the heat capacity of the diesel oxidation catalyst ($c_{P\,DOC}$), and the heat capacity of the exhaust gas ($c_{P\,EG}$).

An exemplary relationship for the variable time constant for the calculation of the light off temperature based on PT1 behaviour is determined by:

$$c_{P_{EG}} \cdot \frac{dm_{EG}}{dt}(T_{in} - T_{out}) = c_{P_{DOC}} \cdot m_{DOC} \cdot \Delta T \quad \text{(I)}$$

$$\tau_{DOC} = \frac{c_{P_{DOC}} \cdot m_{DOC}}{c_{P_{EG}} \cdot \frac{dm_{EG}}{dt}}$$

Wherein $dm_{EG}/dt$ represents the change of the mass of the exhaust gas with time and $\tau_{DOC}$ the delay time until the surface temperature of the diesel oxidation catalyst reaches the temperature of the exhaust gas.

For the consideration of an exothermic reaction in the diesel oxidation catalyst due to late post or after injection, the maximum possible temperature increase preferably is calculated due to the following equation:

$$\Delta T_{PoI} = \frac{dW_{FICmb}}{c_{P_{EG}} \cdot dm_{EG}} \quad \text{(II)}$$

Wherein $\Delta T_{PoI}$ represents the maximum expected increase in temperature after post or after injection and $dW_{FICmb}$ represents the work of the post- or after-injection, which is contained in the fuel.

The light-off detection is based on the comparison between the measured downstream temperature ($T_{Out}$) and the expected temperature with complete hydrocarbon conversion ($T_{in}+\Delta T_{PoI}$).

The efficiency of the diesel oxidation catalyst ($Eff_{DOC}$) preferably is calculated due to the following equation:

$$Eff_{DOC} = \frac{\int m_{EG} \cdot c_p \cdot (T_{meas\_DOC\_Ds} - T_{Sim\_Ds\_w/o\_exothermic}) dt}{\int m_{EG} \cdot c_p \cdot (T_{Sim\_DOC\_Ds\_with\_exothermic} - T_{Sim\_Ds\_w/o\_exothermic}) dt} \quad (III)$$

Wherein $m_{EG}$ represents the mass of the exhaust gas, $c_P$ represents the heat capacity of the exhaust gas, $T_{meas\_DOC\_Ds}$ represents the measured downstream temperature of the diesel oxidation catalyst, $T_{Sim\_Ds\_w/o\_exothermic}$ represents the simulated downstream temperature without exothermic of the diesel oxidation catalyst, which is equal to the surface temperature, and $T_{Sim\_Ds\_with\_exothermic}$ represents the simulated downstream temperature with complete hydrocarbon conversion of the diesel oxidation catalyst ($T_{surface}+\Delta T_{PoI}$).

If the efficiency of the diesel oxidation catalyst ($Eff_{DOC}$) is higher than a threshold, the light-off is detected and the surface temperature at the beginning of the coast down is calculated as a temperature where the light-off is reached. If $Eff_{DOC}$ is lower than a threshold the light-off is not detected and the surface temperature at the beginning of the coast down is calculated as a temperature where the light off is not reached.

Further, the calculated catalyst light-off temperature is compared to a catalyst light-off temperature stored in the engine control unit. Preferably, the light-off temperature stored in the engine control unit for comparison with the calculated catalyst light-off temperature is the stored catalyst light-off temperature of the previous monitoring. Comparing the calculated catalyst light-off temperature to a catalyst light-off temperature stored in the engine control unit preferably includes an analysis of the light-off measurement. Preferably, the analysis of the light-off measurement is based on the coefficient of the efficiency of the diesel oxidation catalyst ($Eff_{DOC}$). Beneficially, the coefficient of the efficiency of the diesel oxidation catalyst as calculated from the measurement is compared to the coefficient of minimal efficiency of the diesel oxidation catalyst ($Eff_{DOC\_min}$).

An evaluation of the efficiency of the diesel oxidation catalyst during last coasting with post injection (PoI) or after injection basically may have the following results: a) a new light-off-temperature resulting in a decrease of the stored light-off-temperature will be stored if a light-off below the current stored light-off temperature is measured; b) no light-off-temperature will be stored meaning no change of the stored light-off temperature if the light-off measured is above the current stored light-off temperature or no light-off was detected below the current stored light-off temperature; or c) a new light-off temperature resulting in an increase of the stored light-off temperature will be stored if no light-off was measured above the current stored light-off temperature.

Hence, the defined light-off temperature may be the calculated light-off temperature or a previously stored light-off temperature.

In a preferred embodiment, the plausibility of the calculated surface temperature is checked. Particularly the plausibility is checked by a comparison of the calculated catalyst light-off temperature to an estimated light-off temperature calculated in the engine control. Preferably, the estimated light-off temperature is calculated on basis of the increase in mileage or the age of the diesel oxidation catalyst. Advantageously, comparing the calculated catalyst light-off temperature to an estimated light-off temperature provides a possibility to ensure the plausibility of the calculated light off temperature. For example, a calculated surface temperature of the diesel oxidation catalyst may be disregarded for defining as catalyst light-off temperature if lying beyond a certain temperature range depending for example on the age of the diesel oxidation catalyst. Advantageously, the comparison of the calculated or measured catalyst light-off temperature to the estimated light-off temperature is a test for determining the accuracy of the measurement and the calculation of the diesel oxidation catalyst light-off temperature.

The calculated surface temperature of the diesel oxidation catalyst is usable to adjust the light-off temperature stored in the engine control unit. Preferably, a weighting factor may be applied to the calculated light off temperature. Advantageously, a weighting factor may provide a calibration factor depending on the accuracy of the measurement. Preferably, the calculated light-off temperature is stored after being adjusted by a weighting factor.

In a preferred embodiment, the light-off temperature of the diesel oxidation catalyst is monitored, determined and stored on board of a motor vehicle. Advantageously, the method of the invention can be carried out online on board during normal operation of the motor vehicle.

Further, the method of the invention provides the advantage that release and reset conditions of the measurement are flexibly tuneable to specific requirements for light-off measurement release. For example release conditions such as no active faults, overrun after constant driving conditions, and/or temperatures in the relevant range, and reset conditions such as overrun finished, injected hydrocarbon-mass during overrun sufficient can be defined. Advantageously, the release and reset conditions can be calculated as a bitword. Further, due to individual calibration it is possible to take free selectable conditions for release and reset into account. Beneficially, the calculated release status can be the input for the injection coordinator to activate a late post or after injection during relevant coastings.

The embodiments of the invention further relate to an apparatus for monitoring the light-off temperature of a diesel oxidation catalyst of a combustion engine comprising a first temperature sensor and a second temperature sensor located upstream and downstream, respectively, of the diesel oxidation catalyst; and a processor unit for calculating the surface temperature of the diesel oxidation catalyst using the temperature data provided by the first and second temperature sensors. By means of the apparatus according to the embodiments of the invention it is possible to determine the actual light-off temperature of the diesel oxidation catalyst for instance after each engine start by means of calculating the surface temperature of the diesel oxidation catalyst. Since the light-off temperature is not considered as a constant but as a changing variable, the aging of the diesel oxidation catalyst is sufficiently considered. Thus, it is provided a means for monitoring the light-off temperature of a diesel oxidation catalyst considering an aging of the diesel oxidation catalyst. The apparatus may be further designed as previously described with respect to the method according to embodiments of the invention.

In a preferred embodiment, the apparatus further comprises a processor unit to compare the determined light-off temperature to an estimated catalyst light-off temperature to provide an assessment of the plausibility of the determination and/or for comparing said calculated surface temperature with a stored surface temperature stored in a storing device.

Advantageously, the apparatus allows for an online on board monitoring of the light-off temperature. It is especially advantageous, that a monitoring of the light-off temperature during normal operation of the motor vehicle is allowed.

The embodiments of the invention further relates to a computer program comprising a program code for performing the method according to embodiments of the invention, when the program is installed on a computer.

Further, the embodiments of the invention relates to a computer program product comprising a program code which is stored on a computer readable data carrier for performing the method according to the invention, when the computer program product is installed on a computer.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
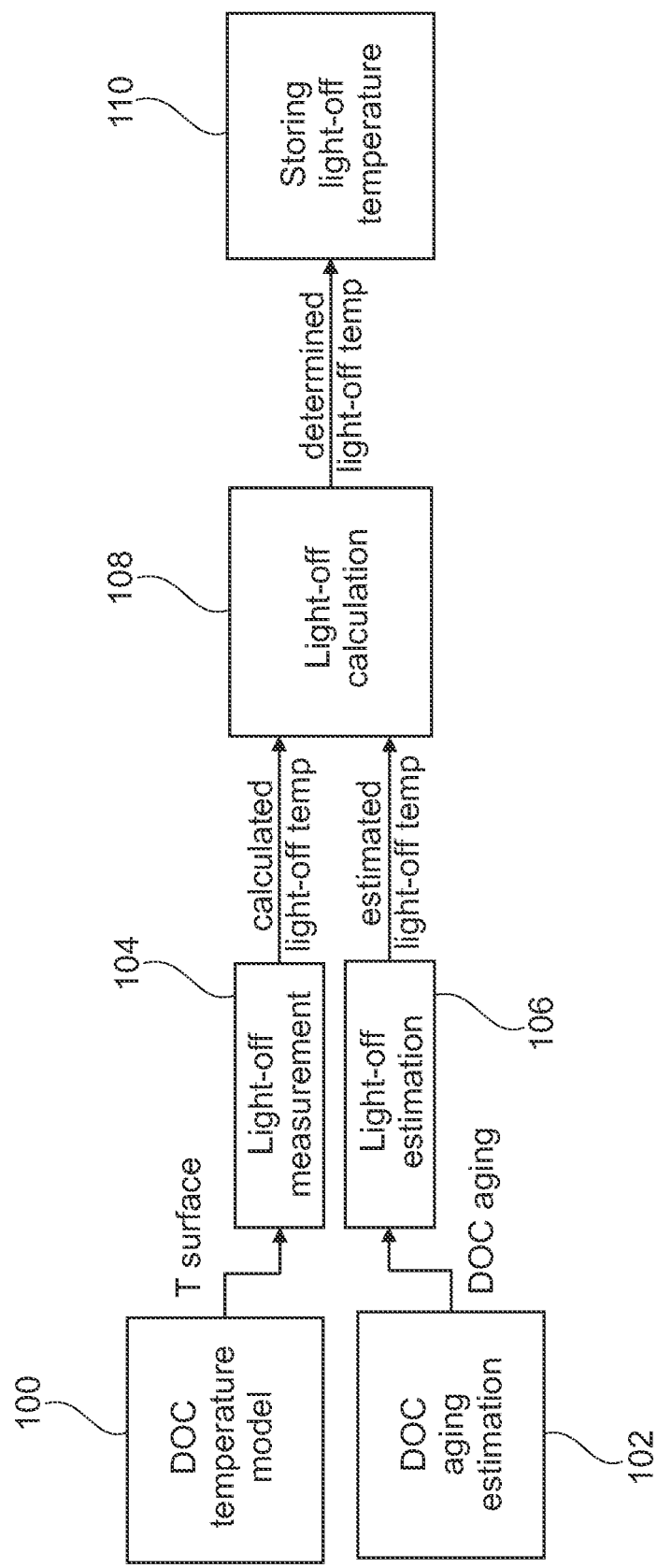
FIG. 1 is a schematic illustration of the method for monitoring the light-off temperature of a diesel oxidation catalyst of a combustion engine according to the present invention.

Referring to FIG. 1, step 104 illustrates that determining the diesel oxidation catalyst light-off temperature is based on a light-off measurement. The calculation of the diesel oxidation catalyst light-off temperature from the temperature data of the exhaust gas is based on a temperature model of the diesel oxidation catalyst 100, incorporating the surface temperature of the diesel oxidation catalyst. The determined catalyst light-off temperature further is compared to an estimated light-off temperature 106 calculated in the engine control unit in a step denoted light-off calculation 108. The light-off estimation 106 is based on an aging estimation of the diesel oxidation catalyst 102. In step 110 the determined light-off temperature is stored in the engine control unit.

Figure 2:
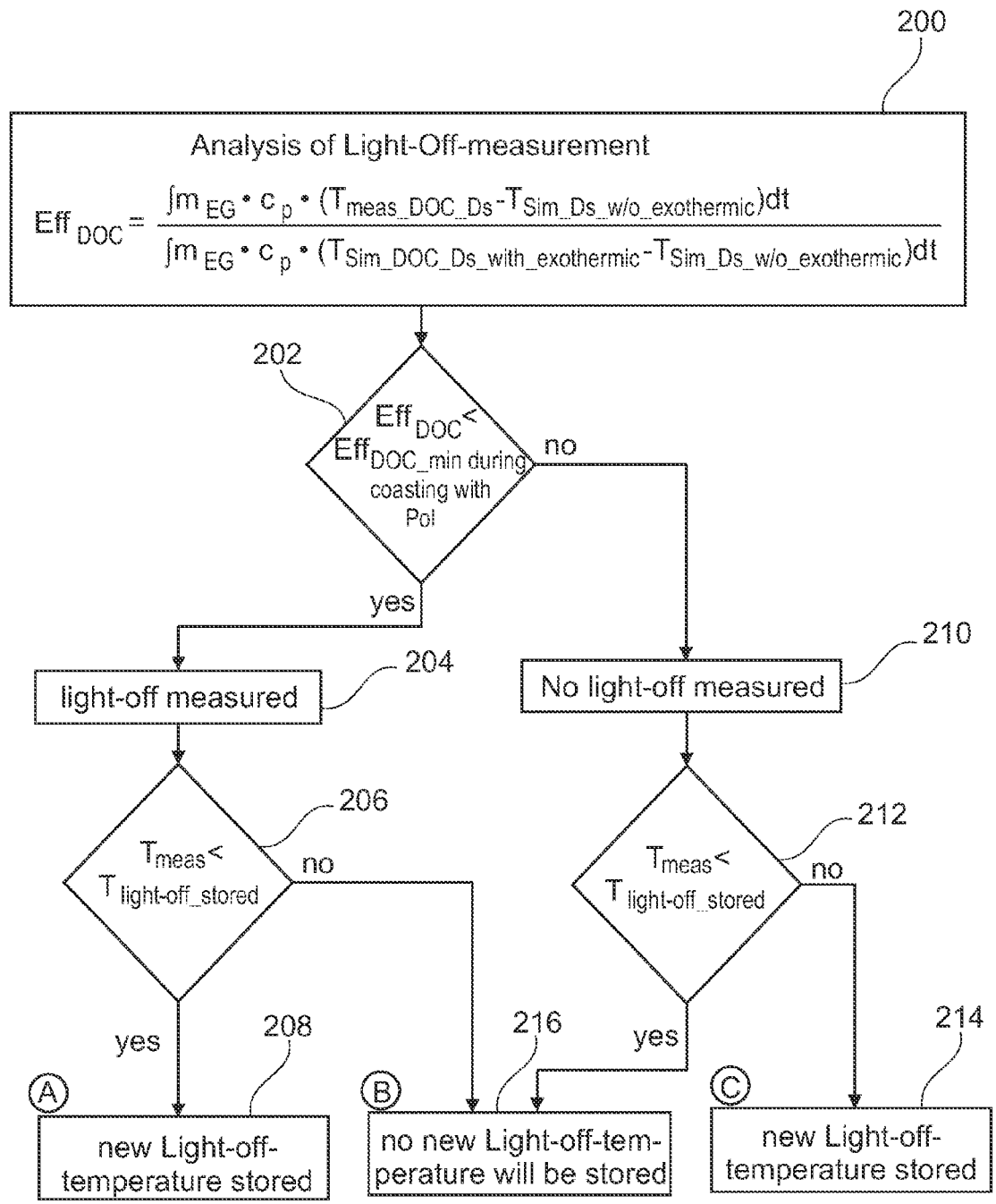
FIG. 2 is a flowchart illustrating exemplary steps executed by the analysis of the light-off measurement of embodiments of the present invention.

Referring to FIG. 2, exemplary steps executed in the analysis of the light-off measurement will be described in detail. In step 200 is illustrated an exemplary relationship for the calculation of the efficiency of the diesel oxidation catalyst ($Eff_{DOC}$), wherein $m_{EG}$ represents the mass of the exhaust gas, $c_P$ represents the heat capacity of the exhaust gas, $T_{meas\_DOC\_Ds}$ represents the measured downstream temperature of the DOC, $T_{Sim\_Ds\_w/o\_exothermic}$ represents the simulated downstream temperature without exothermic of the DOC, which is equal to the surface temperature, and $T_{Sim\_Ds\_with\_exothermic}$ represents the simulated downstream temperature with complete hydrocarbon conversion of the DOC ($T_{surface}+\Delta T_{POI}$). In step 202, the efficiency of the diesel oxidation catalyst ($Eff_{DOC}$) as measured is compared to the minimal efficiency of the diesel oxidation catalyst ($Eff_{DOC\_min}$).

If, as illustrated in step 204, a light-off was measured, it is determined if the measured temperature ($T_{meas}$) is lower compared to the stored light-off temperature ($T_{light-off\_stored}$) in step 206. If a light-off below the current stored light-off temperature was measured a new light-off-temperature resulting in a decrease of the stored light-off-temperature is stored according to step 208. In case that the light-off measured was above the current stored light-off no light-off-temperature is stored according to step 216.

If, as illustrated in step 210, no light-off was measured, it is determined if the measured temperature ($T_{meas}$) is lower compared to the stored light-off temperature ($T_{light-off\_stored}$) in step 212. If no light-off was measured above the current stored light-off temperature, a new light-off temperature resulting in an increase of the stored light-off temperature is stored according to step 214. If no light-off below the current stored light-off temperature was measured no light-off-temperature is stored according to step 216.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for monitoring a light-off temperature of a diesel oxidation catalyst of a combustion engine, comprising the steps of:

measuring a temperature of an exhaust gas upstream and downstream of the diesel oxidation catalyst during a post injection phase or after injection phase of the combustion engine;

determining whether a catalyst light-off occurred by using the temperature of the exhaust gas;

calculating a surface temperature of the diesel oxidation catalyst by using the temperature of the exhaust gas; and defining the calculated surface temperature as the light-off temperature of the diesel oxidation catalyst if the catalyst light-off is determined;

storing the light-off temperature in an engine control unit such that the engine control unit may utilize the light-off temperature in operating the combustion engine;

comparing the surface temperature with the previously stored light-off temperature; replacing the previously stored light-off temperature with the surface temperature if greater than a negligible difference between the surface temperature and the stored light-off temperature is determined;

defining the previously stored light-off temperature as the tight-off temperature if at least one of no light-off is determined and only a negligible difference between the calculated surface temperature and the previously stored light-off temperature is determined; and utilizing the light-off temperature to control post-injection of fuel into the cylinders of the combustion engine.

2. The method according to claim 1, further comprising the step of repeating the measuring, the determining, the calculating, and the defining after an engine start until determining at least one catalyst light-off.

3. The method according to claim 1, further comprising comparing the surface temperature with an estimated light-off temperature calculated in the engine control unit.

4. The method according to claim 1, wherein the measuring the temperature is carried out during a throttling action in an intake tract of the combustion engine.

5. The method according to claim 1, wherein the measuring the temperature is carried out during constant operation mode 6. The method according to claim 1, wherein the measuring the temperature is carried out during a coasting phase of the combustion engine.

7. The method according to claim 1, wherein the calculating the surface temperature of the diesel oxidation catalyst further comprises the step of determining a temperature profile of an exothermic reaction of an oxidation of hydrocarbons in the diesel oxidation catalyst.

8. The method according to claim 1, wherein the calculating the surface temperature of the diesel oxidation catalyst further comprises the step of determining a temperature profile of an exothermic reaction of an oxidation of carbon monoxide in the diesel oxidation catalyst.

9. The method according to claim 1, further comprising the step of checking a plausibility of the surface temperature.

10. The method according to claim 1, further comprising the step of monitoring the light-off temperature of the diesel oxidation catalyst that is determined and stored on board of a motor vehicle.

11. An apparatus for monitoring a light-off temperature of a diesel oxidation catalyst of a combustion engine, comprising:
- a first temperature sensor located upstream of the diesel oxidation catalyst;
- a second temperature sensor located downstream of the diesel oxidation catalyst; and
- a processor in communication with the temperature sensors and adapted to:
  - calculate a surface temperature of the diesel oxidation catalyst using the temperatures provided by the first temperature sensor and the second temperature sensor,
  - determine whether a catalyst light-off occurred by using the temperature of the exhaust gas,
  - define the calculated surface temperature as the light-off temperature of the diesel oxidation catalyst if the catalyst light-off is determined;
  - store the light-off temperature in an engine control unit such that the engine control unit may utilize the light-off temperature in operating the combustion engine;
  - compare the surface temperature with the previously stored light-off temperature;
  - replace the previously stored light-off temperature with the surface temperature if greater than a negligible difference between the surface temperature and a stored light-off temperature is determined;
  - define the previously stored light-off temperature as the light-off temperature if at least one of no light-off is determined and only a negligible difference between the calculated surface temperature and the previously stored light-off temperature is determined; and
  - utilizing the light-off temperature to control post-injection of fuel into the cylinders of the combustion engine.

12. The apparatus according to claim 11, wherein the apparatus comprises a second processor to compare the light-off temperature to an estimated catalyst light-off temperature and provide an assessment of a plausibility.

13. The apparatus according to claim 11, wherein the apparatus comprises a second processor to compare the surface temperature with a stored surface temperature stored in the engine control unit.

14. A non-transitory computer readable medium embodying a computer program product, said computer program product comprising:
a program, the program configured to:
  - measure a temperature of an exhaust gas upstream and downstream of a diesel oxidation catalyst during a post injection phase or after injection phase of a combustion engine;
  - determine whether a catalyst light-off occurred by using the temperature of the exhaust gas;
  - calculate a surface temperature of the diesel oxidation catalyst by using the temperature of the exhaust gas;
  - define the calculated surface temperature as a light-off temperature of the diesel oxidation catalyst if the catalyst light-off is determined;
  - store the light-off temperature in an engine control unit such that the engine control unit may utilize the light-off temperature in operating the combustion engine;
  - compare the surface temperature with the previously stored light-off temperature;
  - replace the previously stored light-off temperature with the surface temperature if greater than a negligible difference between the surface temperature and the stored light-off temperature is determined;
  - define the previously stored light-off temperature as the light-off temperature if at least one of no light-off is determined and only a negligible difference between the calculated surface temperature and the previously stored light-off temperature is determined; and
  - utilize the light-off temperature to control post-injection of fuel into the cylinders of the combustion engine.

15. The non-transitory computer readable medium embodying the computer program product according to claim 14, the program further configured to repeat the measure, the determine, the calculate, and the define after engine start until determining at least one catalyst light-off.

16. The non-transitory computer readable medium embodying the computer program product according to claim 14, the program further configured to compare the surface temperature with an estimated light-off temperature calculated in the engine control unit.

17. The non-transitory computer readable medium embodying the computer program product according to claim 14, wherein the measure of the temperature is carried out during a throttling action in an intake tract of the combustion engine.

18. The non-transitory computer readable medium embodying the computer program product according to claim 14, wherein the measure of the temperature is carried out during constant operation mode.

19. The non-transitory computer readable medium embodying the computer program product according to claim 14, wherein the measure of the temperature is carried out during a coasting phase of the combustion engine.

20. The non-transitory computer readable medium embodying the computer program product according to claim 14, wherein the calculate the surface temperature of the diesel oxidation catalyst comprises a determining of a temperature profile of an exothermic reaction of an oxidation of hydrocarbons in the diesel oxidation catalyst.

21. The non-transitory computer readable medium embodying the computer program product according to claim 14, wherein the calculate the surface temperature of the diesel oxidation catalyst comprises a determining of a temperature profile of an exothermic reaction of an oxidation of carbon monoxide in the diesel oxidation catalyst.

22. The non-transitory computer readable medium embodying the computer program product according to claim 14, the program further configured to check a plausibility of the surface temperature.

23. The non-transitory computer readable medium embodying the computer program product according to claim 14, the program further configured to monitor the light-off temperature of the diesel oxidation catalyst that is determined and stored on board of a motor vehicle.

\* \* \* \* \*